Figure 1:
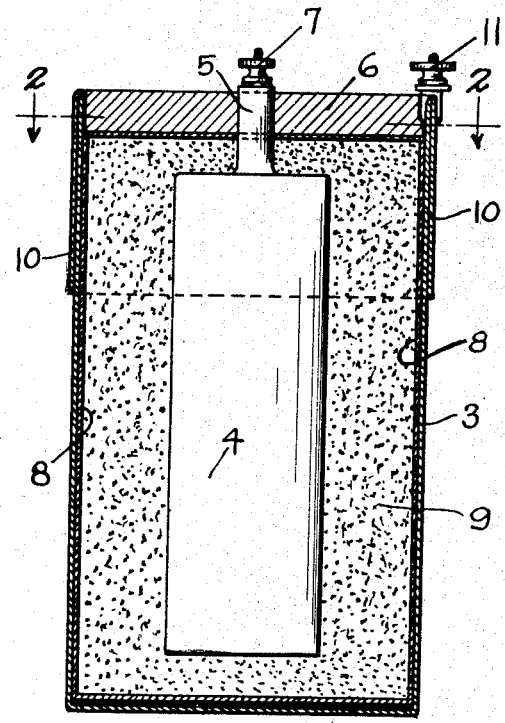

April 21, 1925.

R. S. OWENS

BATTERY CELL

Filed May 16, 1924

1,534,656

INVENTOR
ROBERT STUART OWENS
BY Philip Rich
ATTORNEY

Patented Apr. 21, 1925.

1,534,656

UNITED STATES PATENT OFFICE.

ROBERT STUART OWENS, OF BROOKLYN, NEW YORK.

BATTERY CELL.

Application filed May 16, 1924. Serial No. 713,642.

*To all whom it may concern:*

Be it known that I, ROBERT STUART OWENS, a citizen of the United States, and a resident of the borough of Brooklyn, in the county of Kings, in the city and State of New York, have invented certain new and useful Improvements in Battery Cells, of which the following is a specification, reference being made to the accompanying drawings forming a part thereof.

My invention relates more particularly to dry-battery cells, and the object of my invention is, among other things, to provide a battery cell of this type which will have a long life with increased efficiency by forming the cell structure so as to provide for the variable corrosive attacks on the outer metallic container so far as possible.

Heretofore battery cells of this type have been built whereby the greatest internal resistance is in proximity to the bottom of the cell, and is relatively less near the top resulting in the greater current flow near the top of the cell. Such conditions cause the outer metallic container to be attacked and eaten away near the top margin or upper portion, while the lower portion has not been consumed to any great extent.

My improvement, in its broadest aspect, embodies a dry-battery cell having a thickened metallic wall surrounding the upper part of the cell whereby the consumption of the metal may be proportioned to the normal current-flow from the cell. My invention comprises not only the cell structure in which the mass of the metallic container is increased adjacent the zone of greatest corrosion as just explained, but also the specific details of construction hereinafter set forth in the drawings and this specification and then particularly pointed out in the appended claims.

Figure 2:
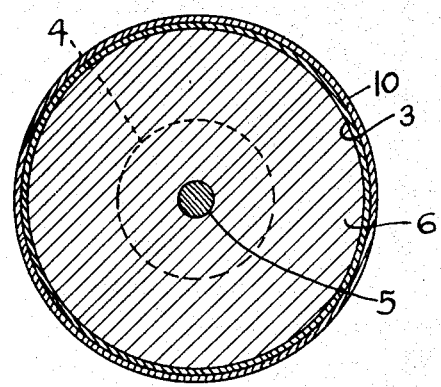

Referring to the drawings, Fig. 1 is a central longitudinal sectional view of one form of battery cell embodying my improvements; and Fig. 2 is a transverse sectional view of the cell taken on the line 2—2 of Fig. 1 looking in the direction of the arrows.

Similar numerals refer to similar parts throughout the several figures.

In the drawings the outer cylindrical metallic vessel 3, preferably of zinc and forming the anode of the cell, contains the inner cathode 4, preferably of carbon, having the neck 5 passing through the cover 6, the top of the neck 5 having the binding-post 7 mounted thereon. The cathode 4 is centrally disposed within the zinc vessel 3 as shown in the figures, and the vessel 3 also carries the bibulous lining 8 secured against the inner surface of the vessel 3 as shown. The vessel 3 also contains the battery-filling material 9, such as an admixture of ammonium chloride and manganese dioxide, which is packed about the cathode 4 beneath the cover 6 as is customary in dry batteries.

In Fig. 1, I have shown one practical form of thickening or increasing the mass of zinc or other suitable metal around the upper portion of the vessel 3 by bending over the upper margin 10 of the metallic zinc until such margin is in surface-to-surface contact with the outer periphery of the vessel 3. The binding-post 11 is secured to the annular fold at the top of the zinc vessel 3 as shown. By this construction the upper portion of the zinc vessel 3 has a double thickness of zinc metal which effectively provides for the unequal corrosion of the zinc at the top of the outer vessel because of the inequalities of the current flow and thereby lengthens the life of the battery cell when in use.

My invention, in its broadest aspects, is not limited to this particular construction shown or to any particular construction or arrangement of parts, or to any particular battery elements, as changes and alterations may be made in the battery cell construction illustrated or in the elements employed without departing from the principles of the invention and without sacrificing its chief advantages.

I claim as my invention:—

1. In a dry battery cell, a metallic electrode with its upper portion formed of a mass of metal having maximum thickness relatively to the lower portion, another electrode adjacent said metallic electrode, and a dry battery-filling material packed around said electrodes and against said upper portion.

2. In a dry battery cell, an outer metallic vessel having its upper side-walls having maximum thickness relatively to the lower portion, an inner electrode arranged within the vessel, and a dry battery-filling material packed around said inner electrode within said vessel and against said upper side-walls.

3. In a dry battery cell, an outer metallic vessel having the mass of metal around the upper portion having maximum thickness relatively to the lower portion, an electrode centrally disposed within the metal vessel, and a dry battery-filling material packed around said electrode and against said upper portion within said vessel.

4. In a dry battery cell, an outer metallic vessel having its upper margin bent over in mutual parallelism with the side walls to form a top portion of double-walled maximum thickness, a carbon electrode centrally disposed within the metal vessel, and a dry battery-filling material packed around said carbon electrode within said vessel and against said upper side-walls.

5. In a dry battery cell, an outer cylindrical vessel having its upper margin bent over in mutual parallelism with the side walls to form a top portion of double-walled maximum thickness, a carbon electrode centrally disposed within the vessel, and a dry battery-filling material packed around said carbon electrode within said vessel and against said upper side-walls.

6. In a dry battery cell, an outer zinc vessel having its upper side-walls having maximum thickness relatively to the lower portion, a bibulous lining therefor, a carbon electrode centrally disposed within the zinc vessel, and a dry battery-filling material packed around said carbon electrode within said vessel and against said upper side-walls.

7. In a dry battery-cell, an outer cylindrical zinc vessel having its upper margin bent over in mutual parallelism with the side walls to form a top portion of double-walled maximum thickness, a bibulous lining therefor, a carbon electrode centrally disposed within said vessel, and a dry battery-filling material packed around said carbon electrode and against said upper side-walls within said vessel.

8. In a dry battery cell, an outer cylindrical zinc vessel forming the anode and having its upper portion having maximum thickness relatively to the lower portion, a carbon cathode centrally disposed within said vessel, a dry battery-filling material packed around the cathode and against the upper portion of said anode within said vessel, and a sealing cover for said vessel.

9. In a dry battery cell, an outer cylindrical zinc vessel forming the anode and having its upper portion having maximum thickness relatively to the lower portion, a carbon cathode centrally disposed within said vessel, a dry battery-filling material packed around the cathode and against the upper portion of said anode within said vessel, and binding-posts on said carbon cathode and zinc anode.

10. In a dry battery-cell, an outer zinc vessel having the mass of its metallic side-walls doubled over in mutual parallelism around the top portion and of decreasing thickness from the top downward, a centrally-disposed carbon electrode within said vessel, and a dry battery-filling material packed around said carbon electrode within said vessel and against said upper side-walls.

11. In a dry battery-cell, an outer zinc vessel having the mass of its metallic side-walls doubled over in mutual parallelism around the top portion and of decreasing thickness from the top downward, a centrally-disposed carbon electrode within said vessel, a dry battery-filling material packed around said carbon electrode within said vessel and against said upper side-walls, and binding posts on said vessel and carbon electrode.

ROBERT STUART OWENS.